(12) United States Patent
Mirzaei et al.

(10) Patent No.: US 9,031,577 B2
(45) Date of Patent: May 12, 2015

(54) SYSTEM AND METHOD FOR SHARING INDOOR LOCATION INFORMATION WITH ONE OR MORE APPLICATION PROGRAM MODULES WITHIN A PORTABLE COMPUTING DEVICE

(71) Applicant: QUALCOMM Incorporated, San Diego, CA (US)

(72) Inventors: Faraz Mohammad Mirzaei, San Jose, CA (US); Saumitra Das, San Jose, CA (US); Behrooz Khorashadi, Moutain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 13/913,392

(22) Filed: Jun. 8, 2013

(65) Prior Publication Data

US 2014/0364146 A1 Dec. 11, 2014

(51) Int. Cl.
*H04W 24/00* (2009.01)
*H04W 4/02* (2009.01)
(52) U.S. Cl.
CPC ..................................... *H04W 4/023* (2013.01)
(58) Field of Classification Search
USPC ....................................................... 455/456.2
See application file for complete search history.

(56) References Cited

U.S. PATENT DOCUMENTS

| 8,350,758 | B1 | 1/2013 | Parvizi et al. |
| 8,385,943 | B1 | 2/2013 | Han et al. |
| 2011/0081919 | A1 | 4/2011 | Das et al. |
| 2011/0090123 | A1 | 4/2011 | Sridhara et al. |
| 2012/0021171 | A1* | 1/2012 | Riviere et al. ................. 428/131 |
| 2012/0028649 | A1 | 2/2012 | Gupta et al. |
| 2012/0290636 | A1* | 11/2012 | Kadous et al. ................ 709/203 |
| 2013/0262223 | A1* | 10/2013 | Catane et al. .............. 705/14.53 |
| 2014/0113665 | A1* | 4/2014 | Li et al. ......................... 455/457 |

* cited by examiner

*Primary Examiner* — Mazda Sabouri
(74) *Attorney, Agent, or Firm* — Smith Risley Tempel Santos LLC

(57) ABSTRACT

A method and system for sharing indoor location information with one or more application program modules within a portable computing device ("PCD") includes receiving an indoor location data request and determining if a location service is currently being executed by the PCD. If the location service is not being executed, it is determined if a location engine of the PCD has been installed. If the location engine of the portable computing device has not been installed, then the code for the location engine is downloaded from a communications network. Next, the location service may be executed once the location engine has been installed. It is determined if the indoor location data being requested is present in a memory element of the PCD. If the indoor location data being requested is not present in the memory element of the PCD, then the indoor location data is downloaded from the communications network.

40 Claims, 7 Drawing Sheets

SYSTEM AND METHOD FOR SHARING INDOOR LOCATION INFORMATION WITH ONE OR MORE APPLICATION PROGRAM MODULES WITHIN A PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

Often PCDs may help people navigate within indoor locations. Currently, PCDs may download individual application programs that may provide indoor location and navigation information. However, one problem with conventional application programs is that they typically require separate and distinct instances of indoor location data such as indoor maps and received signal strength indicator ("RSSI") data. That is, each individual application program usually downloads or has part of its internal infrastructure, separate indoor location data which is not shared with any other application program.

Such a design becomes problematic since separate indoor location data, in the aggregate across multiple application programs, may consume significant amounts of limited memory space within a PCD. Accordingly, there is a need in the art to solve this problem of multiple instances of separate indoor location data for each individual application program running on a PCD.

SUMMARY OF THE DISCLOSURE

A method and system for sharing indoor location information with one or more application program modules within a portable computing device ("PCD") includes receiving an indoor location data request and determining if a location service is currently being executed by the PCD. If the location service is not being executed, it is determined if a location engine of the PCD has been installed. If the location engine of the portable computing device has not been installed, then the code for the location engine is downloaded from a communications network. Next, the location service may be executed once the location engine has been installed. It is determined if the indoor location data being requested is present in a memory element of the PCD. If the indoor location data being requested is not present in the memory element of the PCD, then the indoor location data is downloaded from the communications network.

If the indoor location data being requested is present in the memory element of the portable computing device, then the indoor location data request may be directed to the location service and to the memory element containing the indoor location data.

The memory element within the PCD may have a venue specific region and a general resource region. The venue specific region of the memory element may have at least one of a venue identifier, assistance data, indoor maps, points of interest, crowd-sourced data, and self-sourced data.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device ("PCD") may include a cellular telephone, a pager, a personal digital assistant ("PDA"), a smartphone, a navigation device, or a hand-held computer with a wireless connection or link.

Figure 1A:
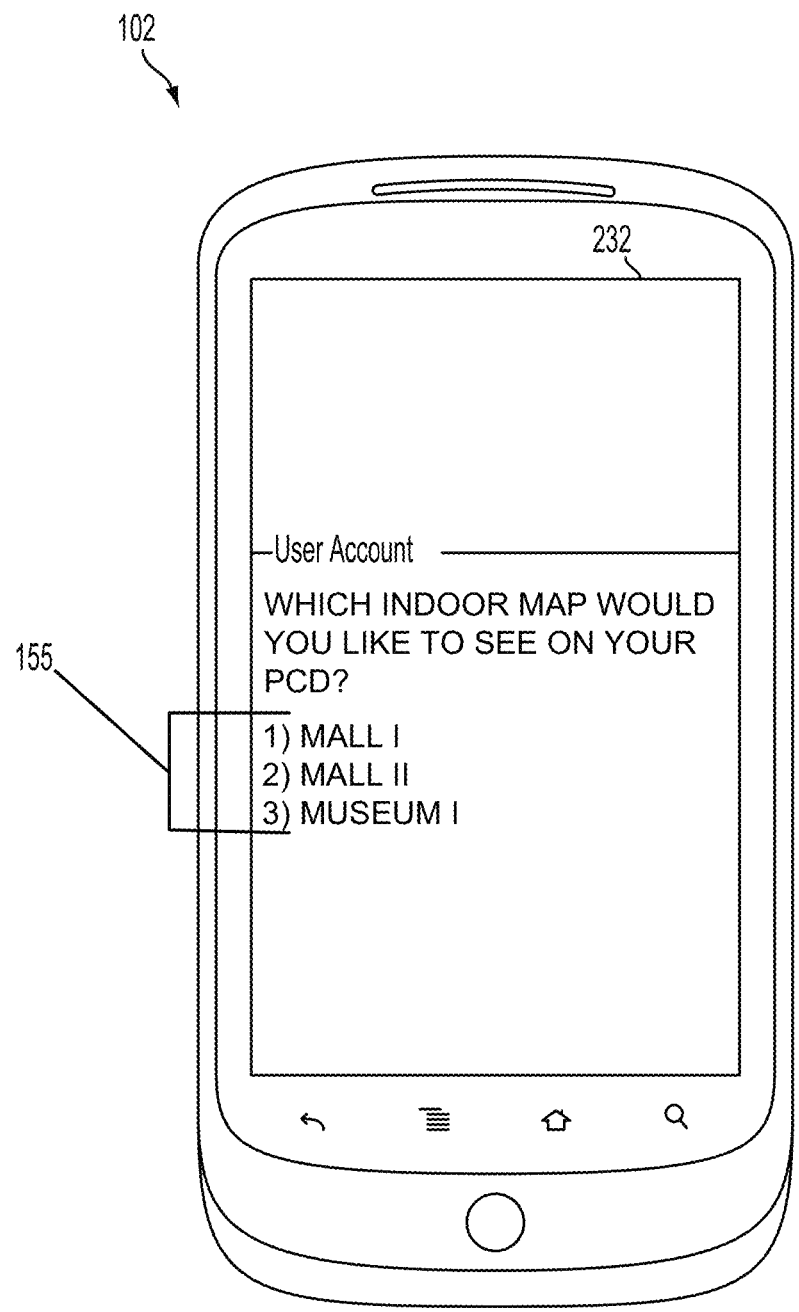
FIG. 1A is a diagram of user interface for retrieving indoor location data that may be displayed on a display device of a portable computing device ("PCD")

FIG. 1A is a diagram of user interface for retrieving indoor location data that may be displayed on a display device 232 of a portable computing device ("PCD") 102. According to this exemplary embodiment, the user interface of an application program 120 (See FIG. 1E) may request an operator of the PCD 102 to select a map for display corresponding to a specific indoor location in which the operator plans to navigate. In the user interface illustrated, the operator is displayed options 155 which list various indoor locations that may be selected by the operator. One of ordinary skill the art recognizes that some application programs may automatically select maps for an operator once any indoor location is detected by an application program 120 running on PCD 102.

Figure 1B:
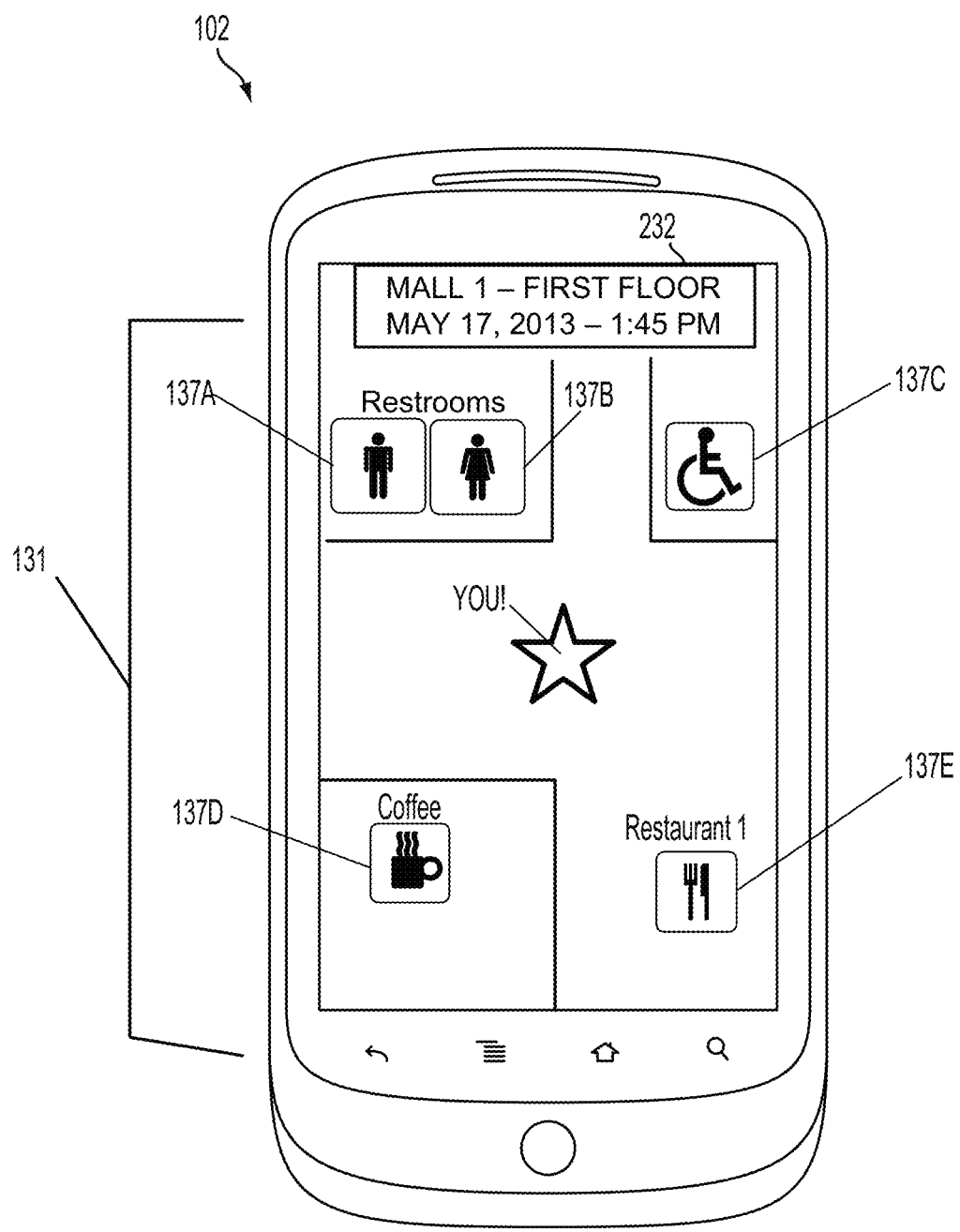
FIG. 1B is a diagram illustrating an indoor location map with icons that may be displayed on a display device of a PCD which designates different locations and/or points of interest on the indoor location map.

FIG. 1B is a diagram illustrating an indoor location map 131 with icons 137 that may be displayed on a display device 232 of a PCD 102 which designate different locations and/or points of interest on the indoor location map 131. These icons 137 may be shared across different application programs 120 as will be described in further detail below. In the exemplary embodiment illustrated in FIG. 1B, exemplary icons 137 include ones which designate restrooms, automated teller machines ("ATMs"), exits, etc. The map 131 of FIG. 1B may comprise location information for a single floor of a building. As an operator of the PCD 102 enters new floors of a building, maps 165 specific to that floor may be displayed on the display device 232.

Figure 1C:
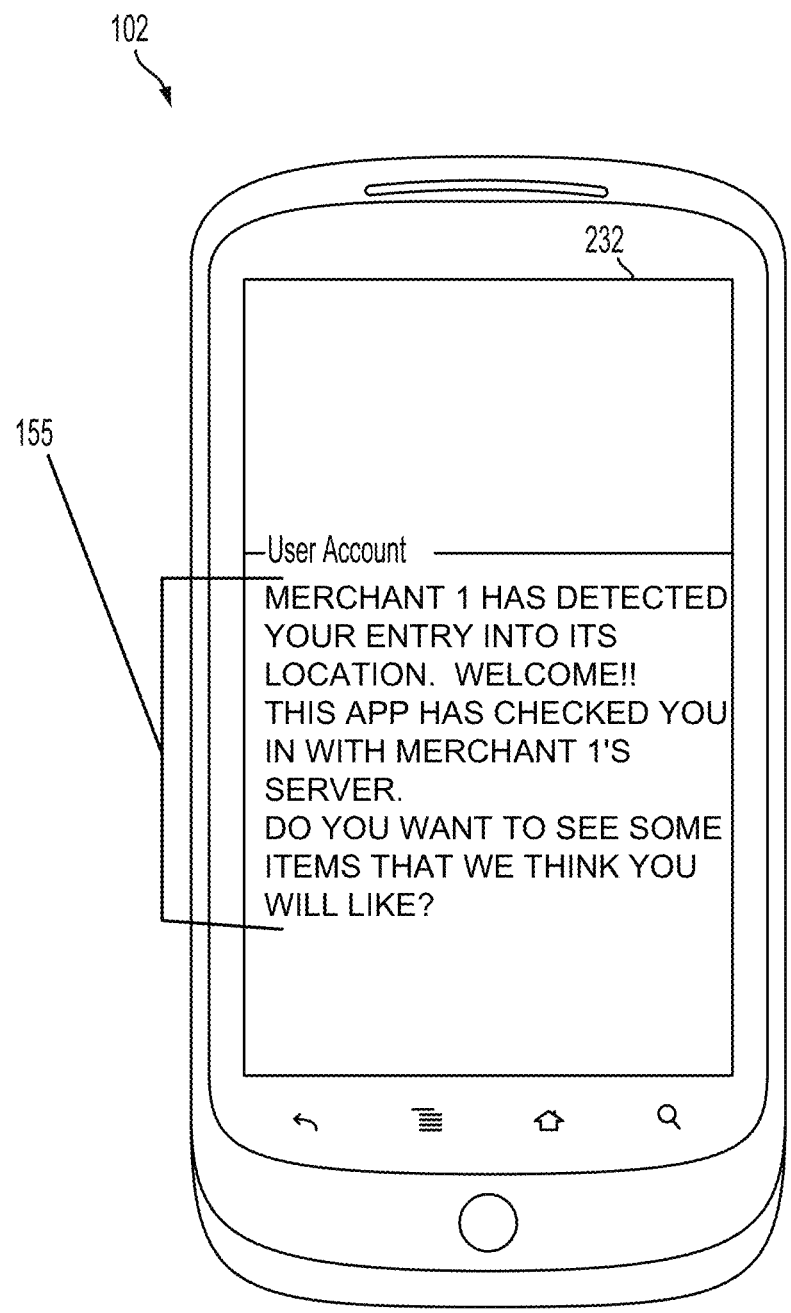
FIG. 1C is a diagram illustrating a user interface for a merchant check-in application on a display device of a PCD.

FIG. 1C is a diagram illustrating a user interface 175 for a merchant check-in application program 120 on a display device 232 of a PCD 102. In this exemplary embodiment, the user interface 175 of the application program 120 has acknowledged that the PCD 102 has entered into an indoor location that corresponds with the application program 120. This particular application program 120 may perform check-in procedures with a server 111 that relate to a retail location or a merchant.

As understood by one of ordinary skill the art, an application program 124 for a particular retail location or merchant may generate receive and/or generate offers to an operator of a PCD 102 when the PCD 102 physically enters into the retail location. Such application programs 124 may enhance the shopping experience for the operator the PCD 102 because the application programs 120 may check-in with the server 111 associated with the retail location or merchant. These application programs 124 use location data described in further detail below in order to determine if a PCD 102 is physically present within a space or retail location operated by a particular merchant.

Figure 1D:
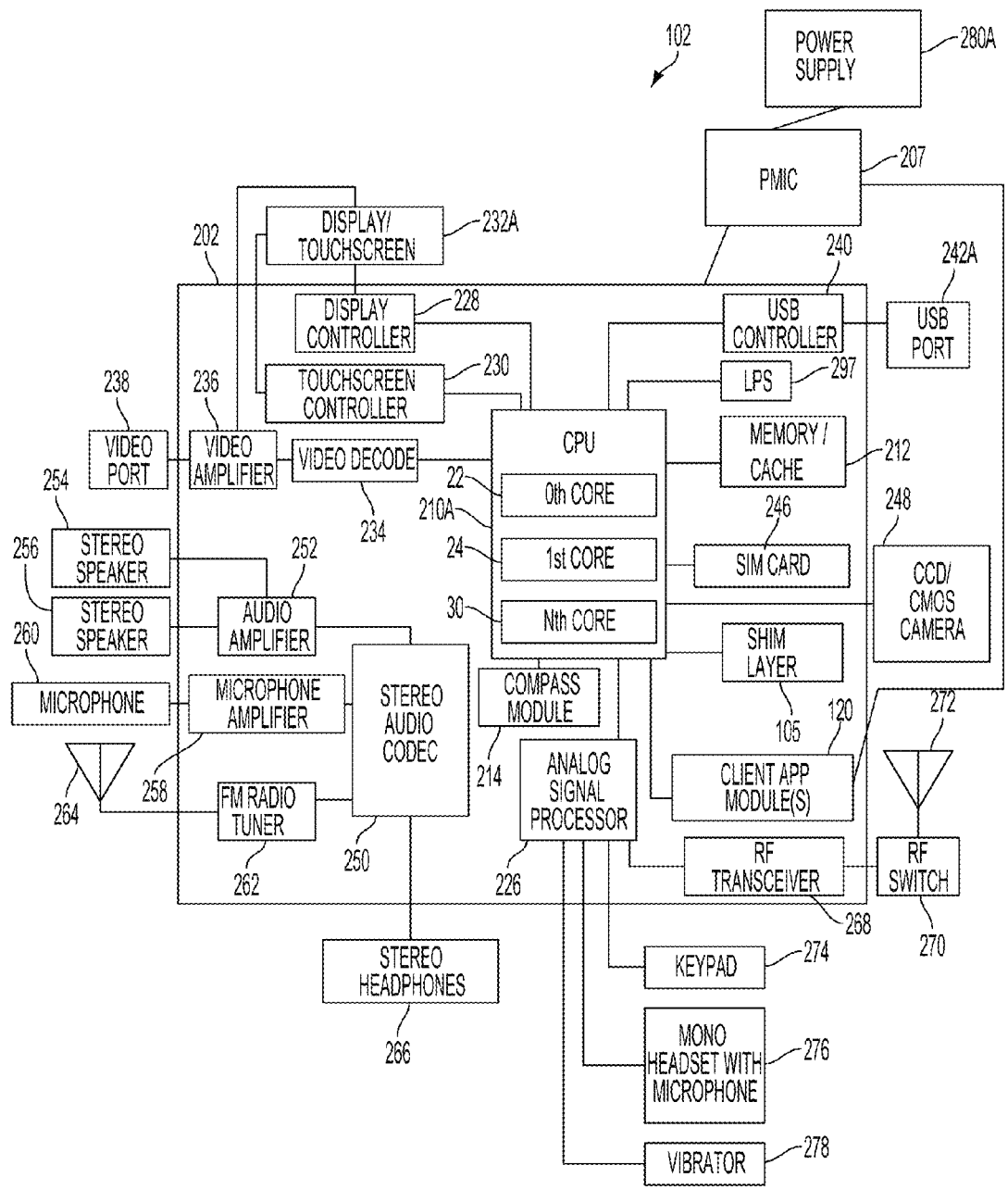
FIG. 1D is a functional block diagram for a portable computing device ("PCD"), such as a mobile phone.

FIG. 1D is a functional block diagram for a portable computing device ("PCD"), such as a mobile phone, that implements methods and systems for sharing indoor location information across a plurality of application program modules 120 within a PCD 102. As shown, the PCD 102 includes an on-chip system 202 that includes a multi-core central processing unit ("CPU") 210A and an analog signal processor 226 that are coupled together. The CPU 210A may comprise a zeroth core 22, a first core 24, and an Nth core 30 as understood by one of ordinary skill in the art. Instead of a CPU 210A, a digital signal processor ("DSP") may also be employed as understood by one of ordinary skill in the art.

A power management integrated circuit ("PMIC") 207 may be responsible for distributing power to the various hardware components present on the chip 202. FIG. 1D also shows that the PCD 102 may include a compass module 214 and a location positioning system ("LPS") module 297.

The LPS module 297 may receive and transmit signals including, location parameters, from satellites, including satellites that are part of the Global Positioning System ("GPS"), Galileo, GLONASS, NAVSTAR, GNSS, any system that uses satellites from a combination of these systems, or any satellite positioning system subsequently developed. The LPS module 297 may also use other network information such as an Internet Protocol ("IP") address, WiFi service set identifiers ("SSIDs") from wireless local area networks (LANs), telecom signal identification, and/or triangulation from sources other than satellites collectively referred to as a Location Positioning System ("LPS") in this disclosure.

As understood by one of ordinary skill in the art, however, the technology of all LPS systems is constantly being improved. New as yet unknown technologies for location determination and for determining location parameters of use with this system 101 may be used and are included in the meaning of "LPS" as described above.

In a particular aspect, one or more of the method steps described herein may be implemented by executable instructions and parameters, stored in the memory/cache 110, that form the shim layer module 105. These instructions that form the shim layer module 105 may be executed by a CPU 210A, an analog signal processor 226, or any other processor to perform the computer implemented methods described herein.

Further, all processors, 210, 226, the memory 110, the instructions stored therein, or a combination thereof residing within the PCD 102 as described in this disclosure may serve as a means for performing one or more of the computer-implemented method steps described herein. As will be described below, the shim layer 105 may comprise software and/or hardware for sharing indoor location information across a plurality of application program modules 120 within a PCD 102.

As illustrated in FIG. 1D, a display controller 228 and a touchscreen controller 230 are coupled to the CPU 210A. A touchscreen display 232 external to the on-chip system 202 is coupled to the display controller 228 and the touchscreen controller 230.

FIG. 1D is a schematic diagram illustrating an embodiment of a portable computing device (PCD) 102 that includes a video decoder 234. The video decoder 234 is coupled to the multicore central processing unit ("CPU") 210A. A video amplifier 236 is coupled to the video decoder 234 and the touchscreen display 232. A video port 238 is coupled to the video amplifier 236. As depicted in FIG. 1D, a universal serial bus ("USB") controller 240 is coupled to the CPU 210A. Also, a USB port 242A is coupled to the USB controller 240. Memory/cache 110 and a subscriber identity module ("SIM") card 246 may also be coupled to the CPU 240A. Further, as shown in FIG. 1D, a digital camera 248 may be coupled to the CPU 240A. In an exemplary aspect, the digital camera 248 is a charge-coupled device ("CCD") camera or a complementary metal-oxide semiconductor ("CMOS") camera.

As further illustrated in FIG. 1D, a stereo audio CODEC 250 may be coupled to the analog signal processor 226. Moreover, an audio amplifier 252 may be coupled to the stereo audio CODEC 250. In an exemplary aspect, a first stereo speaker 254 and a second stereo speaker 256 are coupled to the audio amplifier 252. FIG. 1D shows that a microphone amplifier 258 may be also coupled to the stereo audio CODEC 250. Additionally, a microphone 260 may be coupled to the microphone amplifier 258. In a particular aspect, a frequency modulation ("FM") radio tuner 262 may be coupled to the stereo audio CODEC 250. Also, an FM antenna 264 is coupled to the FM radio tuner 262. Further, stereo headphones 266 may be coupled to the stereo audio CODEC 250.

FIG. 1D further illustrates a radio frequency ("RF") transceiver 268 may be coupled to the analog signal processor 226. An RF switch 270 may be coupled to the RF transceiver 268 and an RF antenna 272. As shown in FIG. 1D, a keypad 274 may be coupled to the analog signal processor 226. Also, a mono headset with a microphone 276 may be coupled to the analog signal processor 226. Further, a vibrator device 278 may be coupled to the analog signal processor 226.

FIG. 1D also shows that a power supply 280, for example a battery, is coupled to the on-chip system 202. In a particular aspect, the power supply includes a rechargeable DC battery or a DC power supply that is derived from an alternating current ("AC") to DC transformer that is connected to an AC power source.

As depicted in FIG. 1D, the touchscreen display 105, the video port 238, the USB port 242A, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator 278, and the power supply 280 are external to the on-chip system 202.

Figure 1E:
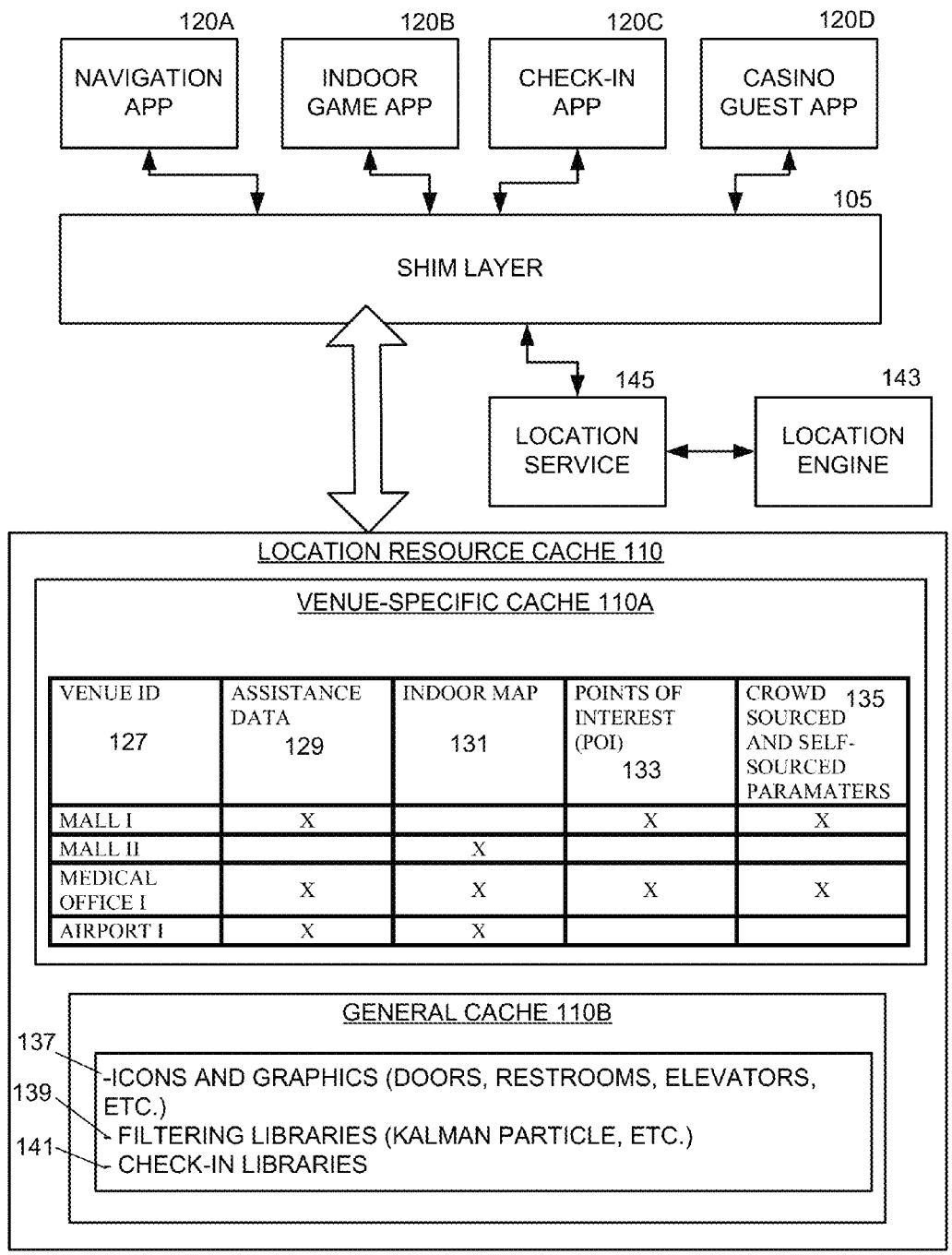
FIG. 1E is a diagram of exemplary software modules and hardware of a system for sharing indoor location information across a plurality of application program modules within a PCD.

FIG. 1E is a diagram of exemplary software modules 105, 120 and hardware 110 of a system 101 for sharing indoor location information across a plurality of application program modules 120 within a PCD 102. One software module 105 may comprise a shim layer that is responsible for managing location data requests from the application program modules 120 and matching those requests with data contained within a location resource cache 110.

The shim layer module 105 functions as an intermediary or balance between application programs 120 and their need for indoor location data, hence the use of the term "shim" as understood by one of ordinary skill the art. The application programs 120 may include a navigational application 120A, in indoor gaming application 120B, a check-in application 120C, and a casino guest application 120D. The inventive system 101 is not limited to these application program modules 120 and may include others not specifically mentioned in this disclosure but are understood as within the scope of this disclosure by one of ordinary skill in the art.

The shim layer module 105 may also communicate and coordinate information gathering by a location engine 143. The location engine 143 may use the indoor location information from the venue specific cache 110A and the general cache 110B in order to determine the current location of the PCD 102 as understood by one of ordinary skill in the art. The location engine 143 may work with the LPS module 297. The location engine 143 may be downloadable from the server 111. The shim layer 105 may relay information between the application programs 120 and the location resource cache 110 which includes the venue specific cache 110A and the general cache 110B as will be described in more detail below.

The location engine 143 may support a location service 145. The location service 145 may utilize various particle filtering libraries 139 which may need access to the assistance data 129. The location service 145 may be responsible for providing the latest location. The location service 145 may comprise a daemon. As understood by one of ordinary skill in the art, a daemon is a computer program that runs as a background process, rather than being under the direct control of an interactive user.

Meanwhile, the location engine 143 is usually located on a lower level of code relative to the daemon or location service 145. The location engine 143 is periodically run and/or called periodically by a scheduler (not illustrated) to perform the computations for updating location information of the PCD 102. In contrast to the location engine 143, the location service 145 or daemon is usually running once it is called and it does not usually perform any computations and relies on the latest data provided by the location engine 143.

The shim layer 105 may facilitate exchange of information among the venue specific cache 110A, the general cache 110B, and the location engine 143 as understood by one of ordinary skill the art. The location resource cache 110 may comprise a venue specific cache 110A and a general cache 110B.

The venue specific cache 110A may comprise a table of data, such as, but not limited to, a table that has at least the following columns: a venue identifier column 127; an assistance data column 129; an indoor map column 131; a points of interest column 133; and a crowd-sourced and self-sourced parameter column 135. Other venue specific data may be included within this venue specific cache 110A as understood by one of ordinary skill the art.

The venue identifier column 127 may comprise a listing of identifiers for different locations that may have indoor location data. In the exemplary embodiment illustrated in FIG. 1E, the exemplary venue identifiers 127 comprise a shopping mall I, shopping mall II, medical office I, in an airport I. The venue identifiers 127 may comprise alphanumeric text. The alphanumeric text may or may not comprise human readable or human decipherable identifiers. Other types of venues besides shopping malls, medical offices, and airports are included within the scope of this disclosure. Any type of indoor location which has corresponding indoor location data may be identified in the venue identifier 127.

Meanwhile, the assistance data column 129 in the venue-specific cache 110A may comprise a set of weights for different locations. Additionally, or in an alternate exemplary embodiments, the assistance data 129 may comprise expected received signal strength indicator ("RSSI") data associated with wireless fidelity ("WiFi") or wireless local area networks ("WLANs"). The assistance data 129 may have high-resolution data settings as well as low resolution data settings. This means that for high resolution data settings a grid map may have a dense set of coordinates for RSSI data. For low resolution data settings, a grid map used for determining an location of the portable computing device 102 may have a dispersed or less dense set of coordinates for RSSI data relative to the high-resolution data settings.

The assistance data 129 may comprise unique grid maps for each indoor location associated with a venue identifier 127. For example, if the venue identifier 127 is associated with a building having multiple floors or stories, then the assistance data 129 associated with that identifier 127 may have unique grid maps for each floor of the building.

The shim layer 105 may be responsible for downloading and updating the data within the venue specific cache 110 and the general cache 115. For example, the shim layer 105 may update the assistance data 129 as application programming interface ("API") calls are received from each respective application program 120 running on the portable computing device 102.

The indoor maps 131 may comprise graphical files used to display maps on a display device. The graphical files may comprise JPEG type files as well as PNG files as understood by one of ordinary skill in the art. The points of interest 133 may comprise text names of locations as well as indoor coordinates, such as RSSI data, that may be searched by a user of the portable computing device 102.

The crowd-sourced and self-sourced parameters 135 may comprise various types of data. For example, self-sourced parameters 135 may include location context identification ("LCI") disambiguation data which allows floor detection to be executed by the portable computing device 102 as understood by one of ordinary skill in the art. The self-sourced parameters 135 also comprise the number of particles used in a particle filter as well as the amount of noise used in such a particle filter.

As understood by one of ordinary skill the art, a particle filter is a mathematical algorithm used by the portable computing device 102 in order to process the assistance data 127 and any crowd-sourced and self-sourced parameters 135. A particle filter assumes that a portable computing device 102 as it traverses two-dimensional map behaves like a random variable. The particle filter may compare received RSSI data with expected values for the RSSI data which are stored in one or more tables contained within the memory of the portable computing device 102. Such particle filtering techniques are known to one of ordinary skill in the art and will not be discussed further in this disclosure.

The crowd-sourced parameters 135 may comprise configuration data which is typically relayed from the portable computing device 102 back to the remote server 111. Such configuration data may include, but is not limited to, media access control ("MAC") addresses and/or threshold values for the RSSI data.

The shim layer 105 may monitor the amount of memory storage available in each respective cache 110A, 110B. If memory storage of a respective cache 110A, 110B is running low, then the shim layer 105 may jettison or erase data from a respective cache 110A, 110B as needed when the shim layer 105 needs to download certain data which was requested by a particular application 120.

The general cache 110B may comprise icons and graphics 137 as well as filtering libraries 139, and check-in libraries 141. The icons and graphics stored 137 in the general cache 110B may be accessed in retrieved from the indoor maps 131 and points of interest data 133 of the venue-specific cache 110A.

Similarly, the filtering libraries 141 stored in the general cache 110A may access the assistance data 129 and crowd-sourced and self-sourced parameters 135 which are assigned to specific venue identifiers 127. The check-in libraries 141 of the general cache 110B may be responsible for managing the check-in operations for the different individual application programs 120.

For example, the check in libraries 141 may be responsible for specific check-in applications 120C that relate to merchant specific or building specific check-ins. Each check-in library 141 may comprise geo-fencing data and or MAC address look-up data which are part of various types of checking algorithms as understood by one of ordinary skill the art. Other types of data which may be stored in the general cache 115 may include, but is not limited to, math libraries, machine learning libraries, statistics libraries, communication and serialization libraries, serialization schemas, database access libraries, compression and decompression data, and algorithm parameters.

The data stored in each cache 110A, 110B may be referenced by the shim layer 105 as shared objects. The shim layer 105 may be responsible for determining if a shared object has been downloaded and if a shared object should remain within a specific cache 110A, 110B because of the likelihood that another application program 120 may need it for its operations.

Figure 1F:
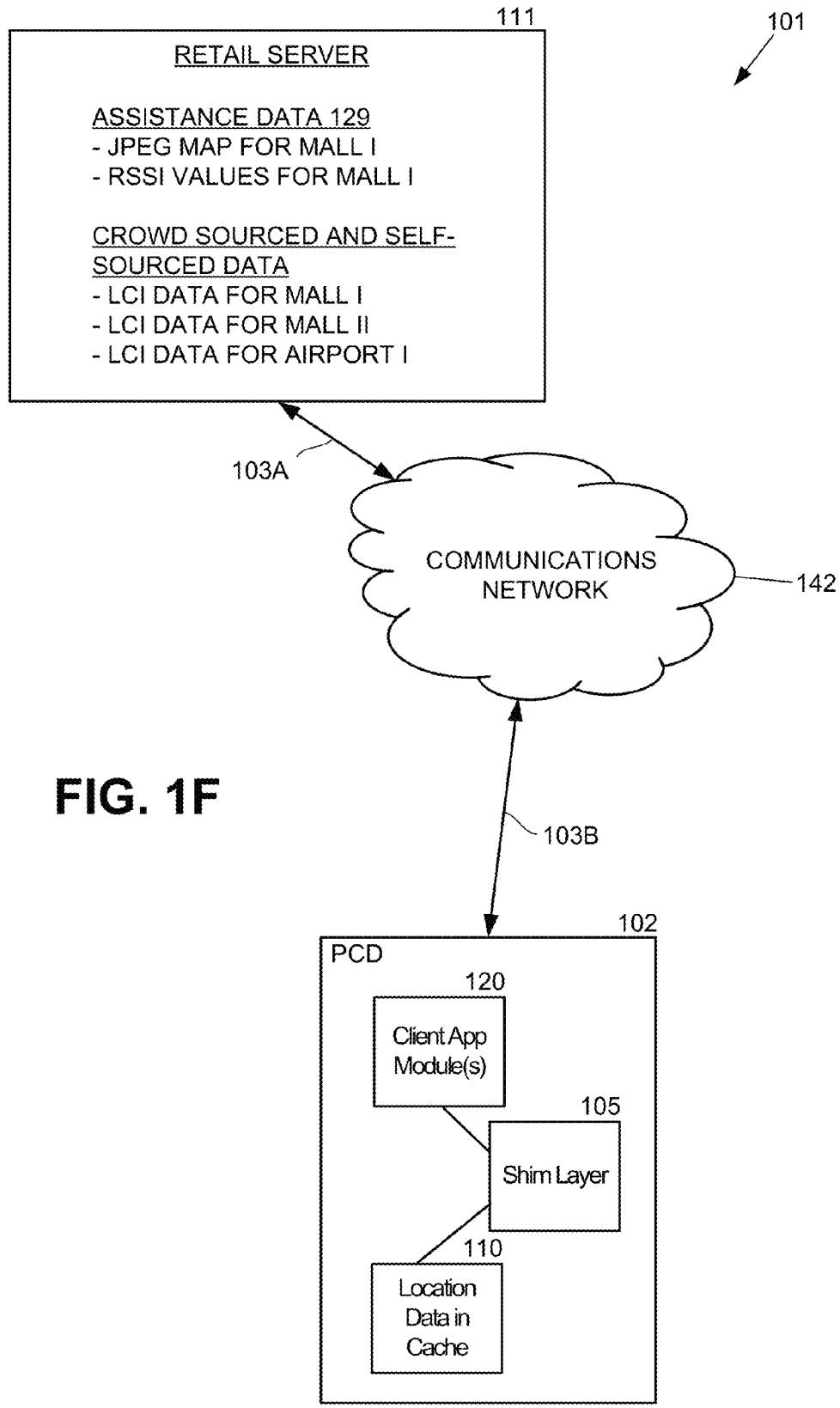
FIG. 1F is a diagram illustrating a system for sharing indoor location information across a plurality of application program modules within a PCD.

FIG. 1F is a diagram illustrating a system 101 for sharing indoor location information across a plurality of application program modules 120 within a PCD 102. Each of the elements of system 101 illustrated in FIG. 1F may be coupled to a communications network 142 via communication links 103. The communication links 103 illustrated in FIG. 1F may comprise wired or wireless communication links. Wireless communication links include, but are not limited to, radio-frequency ("RF") links, such as BLUETOOTH™ RF links as well as infrared links, acoustic links, and other wireless mediums. The communications network 142 may comprise a wide area network ("WAN"), a local area network ("LAN"), the Internet, a Public Switched Telephony Network ("PSTN"), or any combination thereof.

The communications network 142 may be established by broadcast RF transceiver towers (not illustrated). However, one of ordinary skill in the art recognizes that other types of communication devices besides broadcast RF transceiver towers are included within the scope of the system 101 for establishing the communications network 142. The exemplary communication network 142 of FIG. 1F may employ wireless communications towers (not shown) which couple to the antennas of the portable computing device (PCD) 102.

The system 101 may comprise a three tier architecture which has a computer server 111, the communications network 142, and the PCD 102. The computer server 111 may store various information that includes, but is not limited to, the assistance data 129 and the crowd-sourced and self-sourced data 135. In the exemplary embodiment illustrated in FIG. 1F, the assistance data 129 may comprise a JPEG map for mall I and RSSI values for mall I. The crowd-sourced and self-sourced data 135 may comprise LCI data for mall I and LCI data for mall II.

The PCD 102 may request the server 111 to provide any of the indoor location data maintained by or at the server 111. The PCD 102 may request the server 111 to provide indoor location information in response to the shim layer 105 discovering that certain indoor location data is not present within the location resource cache 110. The server 111 may receive requests from the PCD 102 over the communications network 142 and the server 111 may transmit the indoor location data that it has over the communications network 142 back to the PCD 102.

Figure 2:
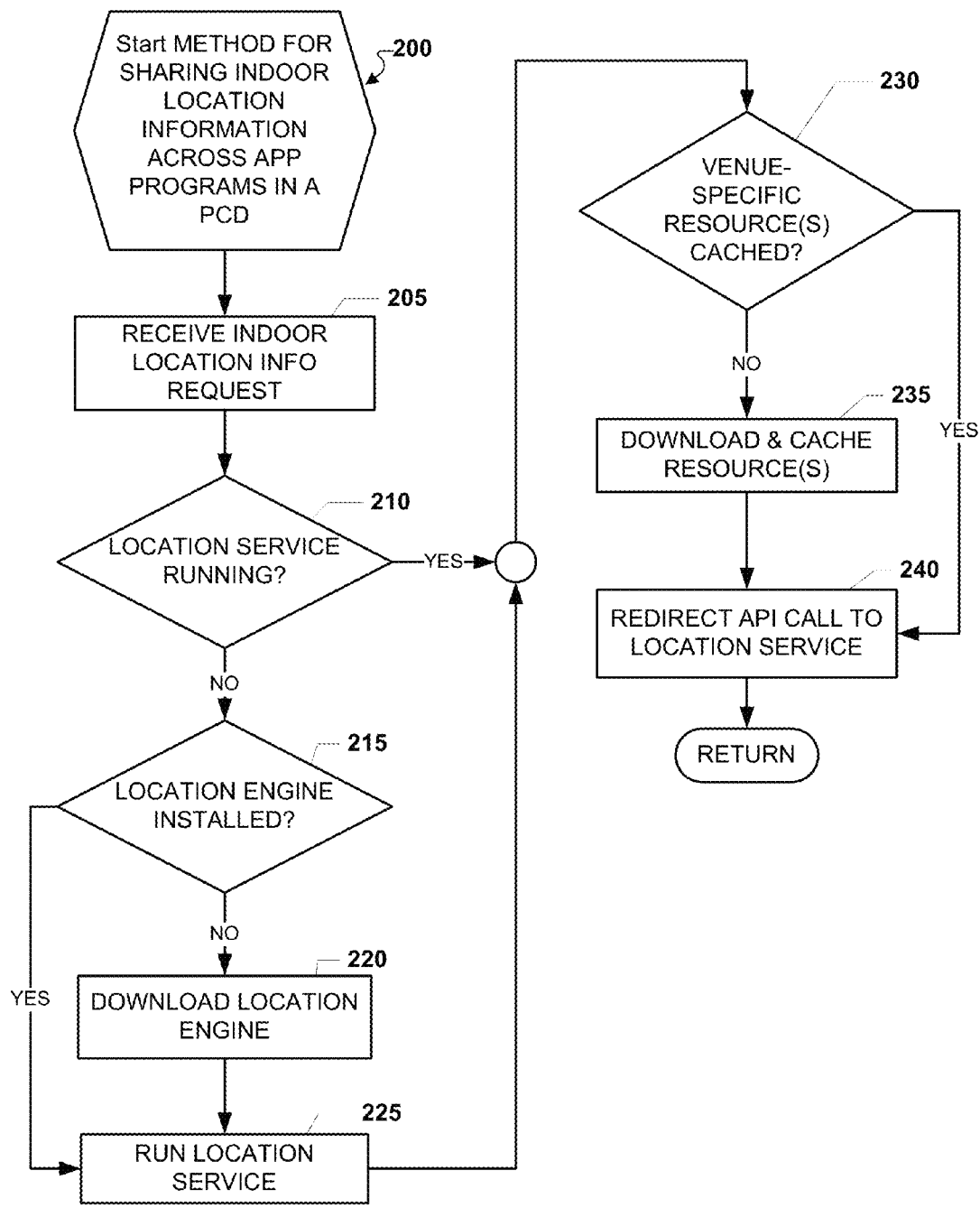
FIG. 2 is a flowchart illustrating a method for sharing indoor location information across a plurality of application program modules within a PCD.

FIG. 2 is a flowchart illustrating a method 200 for sharing indoor location information across a plurality of application program modules 120 within a PCD 102. Block 205 may comprise the first step in the method 200. In block 205, the shim layer 105 may receive an indoor location data request from one or more application programs 120. Next, in decision block 210, the shim layer 105 may determine if the location service 145 is currently running If the inquiry to decision block 210 is negative, then the "NO" branch is followed to decision block 215. If the inquiry to decision block 210 is positive, then the "YES" branch is followed to decision block 230.

In decision block 215, the shim layer 105 determines if the location engine 143 has been installed. The location engine 143 was described above in connection with FIG. 1E.

If the inquiry to decision block 215 is negative, then the "NO" branch is followed to block 220 in which the shim layer 105 downloads the software code from the server 111 for the location engine 143. If the inquiry to decision block 215 is positive, then the "YES" branch is followed to block 225.

In block 225, the shim layer 105 issues a command to the location engine 143 to run the location service 145. Subsequently, in decision block 230, the shim layer determines if the venues specific resources corresponding to the indoor location request received from the application program 120 are present within the location resource cache 110.

If the inquiry to decision block 230 is negative, then the "NO" branch is followed to block 235 in which the shim layer 105 issues a request for the required indoor location resources from the server 111 over the communications network 142. If the inquiry to decision block 230 is positive, then the "YES" branch is followed to block 240 in which the indoor location request is redirected to the location service 145 by the shim layer 105. The shim layer 105 in this block 240 may also relay or pull from the location resource cache 110 the requested indoor location data and transfer it to the location service 145 as appropriate. The method 200 then returns.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the disclosure. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for sharing indoor location information with one or more application program modules within a portable computing device, the method comprising:
   receiving an indoor location data request;
   determining if a location service is currently being executed by the portable computing device;
   if the location service is not being executed, then determining if a location engine of the portable computing device has been installed;
   if the location engine of the portable computing device has not been installed, then downloading code for the location engine from a communications network;
   executing the location service once the location engine has been installed;
   determining if the indoor location data being requested is present in a memory element of the portable computing device; and
   if the indoor location data being requested is not present in the memory element of the portable computing device, then downloading the indoor location data from the communications network.

2. The method of claim 1, further comprising if the indoor location data being requested is present in the memory element of the portable computing device, then redirecting the indoor location data request to the location service and to the memory element containing the indoor location data.

3. The method of claim 1, wherein the memory element comprises a venue specific region and a general resource region.

4. The method of claim 3, wherein the venue specific region of the memory element comprises at least one of a venue identifier, assistance data, indoor maps, points of interest, crowd-sourced data, and self-sourced data.

5. The method of claim 4, wherein the assistance data comprises at least one of a set of weights for different indoor locations; and expected received signal strength indicator ("RSSI") data associated with wireless fidelity ("WiFi") or wireless local area networks ("WLANs").

6. The method of claim 4, wherein the self-sourced data comprises at least one of location context identification ("LCI") data which allows floor detection by the portable computing device; one or more particles used in a particle filter; and an amount of noise used in a particle filter.

7. The method of claim 3, wherein the general resource region of the memory element comprises at least one of icons, graphics, filtering libraries, and check-in libraries.

8. The method of claim 1, wherein receiving the indoor location data request further comprises receiving the indoor location data request from an application program running on the portable computing device.

9. The method of claim 1, further comprising receiving a plurality of indoor location data requests from a plurality of application programs running on the portable computing device.

10. The method of claim 1, wherein the portable computing device comprises at least one of a mobile telephone, a personal digital assistant, a pager, a smartphone, a navigation device, and a hand-held computer with a wireless connection or link.

11. A computer system for sharing indoor location information with one or more application program modules within a portable computing device, the system comprising:
a processor operable for:
receiving an indoor location data request;
determining if a location service is currently being executed by the portable computing device;
determining if a location engine of the portable computing device has been installed if the location service is not being executed;
downloading code for the location engine from a communications network if the location engine of the portable computing device has not been installed;
executing the location service once the location engine has been installed;
determining if the indoor location data being requested is present in a memory element of the portable computing device; and
downloading the indoor location data from the communications network if the indoor location data being requested is not present in the memory element of the portable computing device.

12. The system of claim 11, wherein the processor is further operable for redirecting the indoor location data request to the location service and to the memory element containing the indoor location data if the indoor location data being requested is present in the memory element of the portable computing device.

13. The system of claim 11, wherein the memory element comprises a venue specific region and a general resource region.

14. The system of claim 13, wherein the venue specific region of the memory element comprises at least one of a venue identifier, assistance data, indoor maps, points of interest, crowd-sourced data, and self-sourced data.

15. The system of claim 14, wherein the assistance data comprises at least one of a set of weights for different indoor locations; and expected received signal strength indicator ("RSSI") data associated with wireless fidelity ("WiFi") or wireless local area networks ("WLANs").

16. The system of claim 14, wherein the self-sourced data comprises at least one of location context identification ("LCI") data which allows floor detection by the portable computing device; one or more particles used in a particle filter; and an amount of noise used in a particle filter.

17. The system of claim 13, wherein the general resource region of the memory element comprises at least one of icons, graphics, filtering libraries, and check-in libraries.

18. The system of claim 11, wherein receiving the indoor location data request further comprises receiving the indoor location data request from an application program running on the portable computing device.

19. The system of claim 11, further comprising receiving a plurality of indoor location data requests from a plurality of application programs running on the portable computing device.

20. The system of claim 11, wherein the portable computing device comprises at least one of a mobile telephone, a personal digital assistant, a pager, a smartphone, a navigation device, and a hand-held computer with a wireless connection or link.

21. A computer system for sharing indoor location information with one or more application program modules within a portable computing device, the system comprising:
means for receiving an indoor location data request;
means for determining if a location service is currently being executed by the portable computing device;
means for determining if a location engine of the portable computing device has been installed if the location service is not being executed;
means for downloading code for the location engine from a communications network if the location engine of the portable computing device has not been installed;
means for executing the location service once the location engine has been installed;
means for determining if the indoor location data being requested is present in a memory element of the portable computing device; and
means for downloading the indoor location data from the communications network if the indoor location data being requested is not present in the memory element of the portable computing device.

22. The system of claim 21, further comprising: means for redirecting the indoor location data request to the location service and to the memory element containing the indoor location data if the indoor location data being requested is present in the memory element of the portable computing device.

23. The system of claim 21, wherein the memory element comprises a venue specific region and a general resource region.

24. The system of claim 23, wherein the venue specific region of the memory element comprises at least one of a venue identifier, assistance data, indoor maps, points of interest, crowd-sourced data, and self-sourced data.

25. The system of claim 24, wherein the assistance data comprises at least one of a set of weights for different indoor locations; and expected received signal strength indicator ("RSSI") data associated with wireless fidelity ("WiFi") or wireless local area networks ("WLANs").

26. The system of claim 24, wherein the self-sourced data comprises at least one of location context identification ("LCI") data which allows floor detection by the portable computing device; one or more particles used in a particle filter; and an amount of noise used in a particle filter.

27. The system of claim 23, wherein the general resource region of the memory element comprises at least one of icons, graphics, filtering libraries, and check-in libraries.

28. The system of claim 21, wherein the means for receiving the indoor location data request further comprises means for receiving the indoor location data request from an application program running on the portable computing device.

29. The system of claim 21, further comprising means for receiving a plurality of indoor location data requests from a plurality of application programs running on the portable computing device.

30. The system of claim 21, wherein the portable computing device comprises at least one of a mobile telephone, a personal digital assistant, a pager, a smartphone, a navigation device, and a hand-held computer with a wireless connection or link.

31. A computer program product comprising a non-transitory computer usable medium having a computer readable program code embodied therein, said computer readable program code adapted to be executed to implement a method for sharing indoor location information with one or more application program modules within a portable computing device, said method comprising:

receiving an indoor location data request;

determining if a location service is currently being executed by the portable computing device;

if the location service is not being executed, then determining if a location engine of the portable computing device has been installed;

if the location engine of the portable computing device has not been installed, then downloading code for the location engine from a communications network;

executing the location service once the location engine has been installed;

determining if the indoor location data being requested is present in a memory element of the portable computing device; and if the indoor location data being requested is not present in the memory element of the portable computing device, then downloading the indoor location data from the communications network.

32. The computer program product of claim 31, wherein the program code implementing the method further comprises:

redirecting the indoor location data request to the location service and to the memory element containing the indoor location data if the indoor location data being requested is present in the memory element of the portable computing device.

33. The computer program product of claim 31, wherein the memory element comprises a venue specific region and a general resource region.

34. The computer program product of claim 33, wherein the venue specific region of the memory element comprises at least one of a venue identifier, assistance data, indoor maps, points of interest, crowd-sourced data, and self-sourced data.

35. The computer program product of claim 34, wherein the assistance data comprises at least one of a set of weights for different indoor locations; and expected received signal strength indicator ("RSSI") data associated with wireless fidelity ("WiFi") or wireless local area networks ("WLANs").

36. The computer program product of claim 34, wherein the self-sourced data comprises at least one of location context identification ("LCI") data which allows floor detection by the portable computing device; one or more particles used in a particle filter; and an amount of noise used in a particle filter.

37. The computer program product of claim 33, wherein the general resource region of the memory element comprises at least one of icons, graphics, filtering libraries, and check-in libraries.

38. The computer program product of claim 31, wherein receiving the indoor location data request further comprises receiving the indoor location data request from an application program running on the portable computing device.

39. The computer program product of claim 31, wherein the program code implementing the method further comprises:

receiving a plurality of indoor location data requests from a plurality of application programs running on the portable computing device.

40. The computer program product of claim 31, wherein the portable computing device comprises at least one of a mobile telephone, a personal digital assistant, a pager, a smartphone, a navigation device, and a hand-held computer with a wireless connection or link.

* * * * *